United States Patent
Tang

(10) Patent No.: US 11,184,947 B2
(45) Date of Patent: Nov. 23, 2021

(54) RADIO LINK CONTROL TRANSMISSION METHOD AND RELATED PRODUCTS

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 19 days.

(21) Appl. No.: 16/615,668

(22) PCT Filed: May 24, 2017

(86) PCT No.: PCT/CN2017/085797
§ 371 (c)(1),
(2) Date: Nov. 21, 2019

(87) PCT Pub. No.: WO2018/214081
PCT Pub. Date: Nov. 29, 2018

(65) Prior Publication Data
US 2020/0092943 A1  Mar. 19, 2020

(51) Int. Cl.
*H04W 28/06* (2009.01)
*H04W 80/02* (2009.01)
(Continued)

(52) U.S. Cl.
CPC .......... *H04W 80/02* (2013.01); *H04L 1/1614* (2013.01); *H04L 1/1642* (2013.01); *H04L 5/0055* (2013.01)

(58) Field of Classification Search
None
See application file for complete search history.

(56) References Cited

U.S. PATENT DOCUMENTS 8,401,017 B2 *  3/2013  Wang ................... H04L 1/1621
370/394
8,473,825 B2 *  6/2013  Burbidge ............. H04L 1/1628
714/782
(Continued)

FOREIGN PATENT DOCUMENTS

CN          101009537 A      8/2007
CN          101489252 A      7/2009
(Continued)

OTHER PUBLICATIONS

International Search Report in the international application No. PCT/CN2017/085797, dated Feb. 23, 2018.
(Continued)

*Primary Examiner* — Sithu Ko
(74) *Attorney, Agent, or Firm* — Ladas & Parry, LLP

(57) ABSTRACT

Disclosed in embodiments of the present invention are a radio link control (RLC) transmission method and related products, the method comprising: receiving a first RLC protocol data unit (PDU) set from a transmit end RLC entity, the first RLC PDU set being generated by the transmit end RLC entity according to an original data segment; when it is detected that a plurality of RLC PDU s in the first RLC PDU set is not successfully received, transmitting a state report of an indication domain carrying the sequence number (SN) of the plurality of RLC PDUs; receiving a second RLC PDU set from the transmit end RLC entity; and obtaining the original data segment according to the first RLC PDU set and the second RLC PDU set. The embodiments resolve the problem of large overhead of the state report fed back to the transmit end RLC entity when a receive end RLC entity needs the transmit end RLC entity to retransmit the RLC PDUs in a 5G NR system.

11 Claims, 9 Drawing Sheets

(51) Int. Cl.
  *H04L 1/16* (2006.01)
  *H04L 5/00* (2006.01)

(56) References Cited

U.S. PATENT DOCUMENTS

| | | | |
|---|---|---|---|
| 10,772,017 B2* | 9/2020 | Kim | H04W 74/0833 |
| 2004/0013105 A1* | 1/2004 | Ahmavaara | H04L 1/1819 |
| | | | 370/349 |
| 2008/0043651 A1* | 2/2008 | Okamoto | H04L 47/365 |
| | | | 370/310 |
| 2009/0175206 A1 | 7/2009 | Wang | |
| 2012/0082096 A1* | 4/2012 | Cave | H04L 1/1848 |
| | | | 370/328 |
| 2015/0237621 A1 | 8/2015 | Zhu | |
| 2018/0287748 A1* | 10/2018 | Kim | H04L 49/9047 |
| 2018/0316619 A1* | 11/2018 | Hong | H04L 69/321 |
| 2018/0317114 A1* | 11/2018 | Kim | H04L 1/1685 |
| 2019/0297667 A1* | 9/2019 | Quan | H04W 28/06 |
| 2020/0077299 A1* | 3/2020 | Wu | H04W 28/065 |
| 2020/0077330 A1* | 3/2020 | Korneluk | H04W 48/18 |

FOREIGN PATENT DOCUMENTS

| | | |
|---|---|---|
| CN | 101651527 A | 2/2010 |
| CN | 103999394 B | 5/2017 |
| RU | 2460218 C2 | 8/2012 |
| TW | I369883 B | 8/2012 |
| TW | I442732 B | 6/2014 |
| TW | I508485 B | 11/2015 |
| WO | 2007051922 A1 | 5/2007 |
| WO | 2007078142 A1 | 7/2007 |
| WO | 2007091838 A1 | 8/2007 |
| WO | 2014075210 A1 | 5/2014 |
| WO | 2014075284 A1 | 5/2014 |
| WO | 2015180066 A1 | 12/2015 |

OTHER PUBLICATIONS

Written Opinion of the International Search Authority in the international application No. PCT/CN2017/085797, dated Feb. 23, 2018.
First Office Action of the Chilean application No. 201903416, dated Dec. 16, 2020.
First Office Action of the Canadian application No. 3064468, dated Jan. 8, 2021.
First Office Action of the Indian application No. 201917051246, dated Jan. 29, 2021.
Intel Corporation, RLC status report in NR, 3GPP TSG-RAN WG2 Meeting #97bis R2-1703437 Spokane, USA, Apr. 3-7, 2017.
Ericsson, RLC Status report format, 3GPP TSG-RAN WG2 #97bis Tdoc R2-1702740 Spokane, USA, Apr. 3-7, 2017.
Huawei et al: "RLC status PDU", 3GPP Draft; R2-1705209 RLC Status PDU, 3rd Generation Partnership Project (3GPP), Mobile Competence Centre ; 650, Route Des Lucioles ; F-06921 Sophia-Antipolis Cedex ; France, vol. RAN WG2, No. Hangzhou, China; May 15, 2017-May 19, 2017 May 14, 2017 (May 14, 2017), XP051275684, Retrieved from the Internet: URL:http://www.3gpp.org/ftp/Meetings_3GPP_SYNC/RAN2/Docs/ [retrieved on May 14, 2017] * the whole document *.
Nokia et al: "RLC status report format", 3GPP Draft; R2-1705077 RLC Status Report Format, 3rd Generation Partnership Project (3GPP), Mobile Competence Centre ; 650, Route Des Lucioles ; F-06921 Sophia-Antipolis Cedex ; France, vol. RAN WG2, No. Hangzhou, China; May 15, 2017-May 19, 2017 May 14, 2017 (May 14, 2017), XP051275559, Retrieved from the Internet: URL:http://www.3gpp.org/ftp/Meetings_3GPP_SYNC/RAN2/Docs/ [retrieved on May 14, 2017] * whole document *.
ZTE: "Consideration on PDCP Status Report", 3GPP Draft; R2-1704671 Consideration on PDCP Status Report, 3rd Generation Partnership Project (3GPP) , Mobile Competence Centre ; 650, Route Des Lucioles ; F-06921 Sophia-Antipolis Cedex; France, vol. RAN WG2, No. Hangzhou, China; May 15, 2017-May 19, 2017 May 14, 2017 (May 14, 2017) , XP051275216, Retrieved from the Internet: URL:http://www.3gpp.org/ftp/Meetings_3GPP_ SYNC/RAN2/Docs/ [retrieved on May 14, 2017] * the whole document *.
Supplementary European Search Report in the European application No. 17911376.6, dated Apr. 7, 2020.
First Office Action of the Russian application No. 2019141934, dated Jun. 4, 2020.
English translation of the Written Opinion of the International Search Authority in the international application No. PCT/CN2017/085797, dated Feb. 23, 2018.
First Office Action of the Chinese application No. 201911423037.4, dated May 8, 2021.
First Office Action of the Japanese application No. 2019-564968, dated Apr. 16, 2021.
Written Opinion of the Singaporean application No. 11201910975T, dated May 12, 2021.
First Office Action of the Taiwanese application No. 107114990, dated Jun. 22, 2021.
Second Office Action of the Chinese application No. 201911423037.4, dated Aug. 10, 2021.
Second Office Action of the Chilean application No. 201903416, dated Sep. 13, 2021.

* cited by examiner

Sending-side RLC entity   Receiving-side RLC entity

RADIO LINK CONTROL TRANSMISSION METHOD AND RELATED PRODUCTS

CROSS-REFERENCE TO RELATED APPLICATION

This application is the U.S. national phase of PCT/CN2017/085797, filed on May 24, 2017, the disclosure of which is incorporated by reference herein in its entirety.

TECHNICAL FIELD

The disclosure relates to the technical field of communications, and more particularly to a method for radio link control (RLC) transmission and a related product.

BACKGROUND

5th-Generation (5G) New Radio (NR) is a subject raised recently by the 3rd Generation Partnership Project (3GPP). Along with increasingly deep discussions about the 5G technology, on one hand, because of backward compatibility of a communication system, a new technology researched and developed later tends to be compatible with a technology which has been standardized before; and on the other hand, because of existence of numerous existing designs for 4th-Generation (4G) mobile communication Long Term Evolution (LTE), flexibility of 5G may inevitably be sacrificed for compatibility, resulting in reduction in performance. Therefore, researches in two directions are concurrently made by the 3GPP at present. Herein, the technical discussion group not considering backward compatibility is called 5G NR.

In an LTE system, a protocol stack of a wireless interface includes an RLC-layer protocol, and the RLC-layer protocol has a main function of segmenting and re-assembling a received upper-layer data packet to adapt the segmented and re-assembled data packet to practical transmission of the wireless interface. For a Radio Bearer (RB) with an error-free transmission requirement, the RLC-layer protocol may further recover a lost data packet through a retransmission mechanism, each RB corresponding to one or more RLC entities.

It is specified in the LTE RLC-layer protocol that in an existing retransmission feedback mechanism of an RLC Acknowledged Mode (AM), a sending-side RLC entity may configure a Sequence Number (SN) for each protocol data unit (PDU) during transmission of the PDUs, the sending-side RLC entity sends the PDUs according to the SNs, meanwhile, the sending-side RLC entity may configure a receiving-side RLC entity to feed back a receiving status in a preset format, and the receiving-side RLC entity notifies the sending-side RLC entity of the maximum SN in the PDUs that have been successfully received and the SNs of the PDUs that are not successfully received through a status report (i.e., STATUS PDU). The sending-side RLC entity determines the PDUs to be retransmitted according to the status report.

In existing NR RLC discussions, a basic function of an RLC entity is optimization according to LTE RLC. Compared with LTE RLC (in the LTE RLC protocol, a PDU is an RLC bearer of a Service Data Unit (SDU), and the PDU is filled with the SDU subjected to segmentation or concatenation, namely the SDU is packaged into the PDU), NR RLC (in an Unacknowledged Mode (UM) and an AM) will not support an SDU concatenation function but still have an SDU segmentation function. This means that there are only four cases illustrated in FIG. 1A for NR RLC PDUs: case 1) an RLC PDU includes the only one complete RLC SDU; case 2) an RLC PDU includes a segment of the only one RLC SDU, the segment being located in front of the RLC SDU; case 3) an RLC PDU includes a segment of an RLC SDU, the segment being located in middle of the RLC SDU; and case 4) an RLC PDU includes a segment of an RLC SDU, the segment being located in back of the RLC SDU.

Abandoning the NR RLC concatenation function means that each RLC PDU only includes at most one RLC SDU (case 1) or part of the RLC SDU (case 2, 3, 4) or a segment portion of an RLC PDU. Each RLC AM Data (AMD) PDU is required to be identified with an SN, and the RLC PDU is multiplexed into a Medium Access Control (MAC) PDU in a MAC layer. From the view of overhead, after RLC concatenation is abandoned, a status report sent to a sending-side RLC entity by a receiving-side RLC entity is required to include a large amount of information and then the sending-side RLC entity may correctly retransmit an RLC PDU segment which is needed to be retransmitted, which increases a feedback overhead of the RLC entity.

SUMMARY

Embodiments of the disclosure provide a method for RLC transmission control and a related product, to improve flexibility of transmission of scheduling requests in a wireless communication system and improve resource scheduling efficiency of a data transmission channel in the wireless communication system.

According to a first aspect, the embodiments of the disclosure provide a method for RLC transmission, which may include the following operations.

A first RLC PDU set is received from a sending-side RLC entity. The first RLC PDU set is generated by the sending-side RLC entity according to a raw data segment.

Responsive to detecting that multiple RLC PDUs in the first RLC PDU set are not successfully received, a status report containing an indication domain for SNs of the multiple RLC PDUs.

A second RLC PDU set is received from the sending-side RLC entity.

The raw data segment is acquired according to the first RLC PDU set and the second RLC PDU set.

According to a second aspect, the embodiments of the disclosure provide a method for RLC transmission, which may include the following operations.

A first RLC PDU set is sent to a receiving-side RLC entity. The first RLC PDU set is generated according to a raw data segment.

A status report containing an indication domain for SNs of multiple RLC PDUs is received from the receiving-side RLC entity. The status report is sent by the receiving-side RLC entity responsive to detecting that the multiple RLC PDUs in the first RLC PDU set are not successfully received.

A second RLC PDU set is sent to the receiving-side RLC entity. The first RLC PDU set and the second RLC PDU set are used to acquire the raw data segment.

According to a third aspect, the embodiments of the disclosure provide a receiving-side RLC entity, which has a function of implementing operations of a terminal in the method design. The function may be realized through hardware or may be realized by executing corresponding software through the hardware. The hardware or the software includes one or more modules corresponding to the function.

In a possible design, the receiving-side RLC entity includes a processor, and the processor is configured to support the receiving-side RLC entity to realize the corresponding function in the method. Furthermore, the receiving-side RLC entity may further include a communication interface, and the communication interface is configured to support communication between the receiving-side RLC entity and a sending-side RLC entity. Furthermore, the receiving-side RLC entity may further include a memory, and the memory is configured to be coupled to the processor, and stores necessary program instructions and data of the receiving-side RLC entity.

According to a fourth aspect, the embodiments of the disclosure provide a sending-side RLC entity, which has a function of implementing operations of the sending-side RLC entity in the method design. The function may be realized through hardware or may be realized by executing corresponding software through the hardware. The hardware or the software includes one or more modules corresponding to the function.

In a possible design, the sending-side RLC entity includes a processor, and the processor is configured to support the sending-side RLC entity to realize the corresponding function in the method. Furthermore, the sending-side RLC entity may further include a transceiver, and the transceiver is configured to support communication between the sending-side RLC entity and a receiving-side RLC entity. Furthermore, the sending-side RLC entity may further include a memory, and the memory is configured to be coupled to the processor, and stores a necessary program instruction and data of the sending-side RLC entity.

According to a fifth aspect, the embodiments of the disclosure provide a receiving-side RLC entity, which may include a processor, a memory, a communication interface and one or more programs. The one or more programs may be stored in the memory and configured to be executed by the processor, and the programs may include instructions configured to execute the steps in any method according to the second aspect of the embodiments of the disclosure.

According to a sixth aspect, the embodiments of the disclosure provide a sending-side RLC entity, which may include a processor, a memory, a Radio Frequency (RF) chip and one or more programs. The one or more programs may be stored in the memory and configured to be executed by the processor, and the programs may include instructions configured to execute the steps in any method according to the first aspect of the embodiments of the disclosure.

According to a seventh aspect, the embodiments of the disclosure provide a computer-readable storage medium, which may store a computer program for electronic data exchange, the computer program enabling a computer to execute part or all of the steps described in any method according to the first aspect or second aspect of the embodiments of the disclosure and the computer including a receiving-side RLC entity and a sending-side RLC entity.

According to a ninth aspect, the embodiments of the disclosure provide a computer program product, which may include a non-transitory computer-readable storage medium storing a computer program. The computer program may be operable to enable a computer to execute part or all of the steps described in any method according to the first aspect of the embodiments of the disclosure. The computer program product may be a software installation package, and the computer may include a receiving-side RLC entity and a sending-side RLC entity.

From the above, it can be seen that, in the embodiments of the disclosure, when the receiving-side RLC entity receives the first RLC PDU set generated according to the raw data segment from the sending-side RLC entity, and determines that the multiple RLC PDUs in the first RLC PDU set are not successfully received, the receiving-side RLC entity sends the status report only including the indication domain for the SNs of the multiple RLC PDUs to the sending-side RLC entity. And then the sending-side RLC entity generates the second RLC PDU set according to the status report and sends it to the receiving-side RLC entity. The receiving-side RLC entity may acquire the raw data segment according to the first RLC PDU set and the second RLC PDU set. In such a manner, the receiving-side RLC PDU, responsive to determining that the multiple RLC PDUs in the first RLC PDU set are not successfully received, sends the status report only including the indication domain for the SNs of the multiple RLC PDUs to the sending-side RLC entity, which reduces an overhead of the status report feedback to the sending-side RLC entity. Therefore, the embodiments of the disclosure solve the problem of relatively high overhead in status report feedback at a receiving-side RLC entity when the receiving-side RLC entity needs a sending-side RLC entity to retransmit an RLC PDU in a 5G NR system.

BRIEF DESCRIPTION OF DRAWINGS

The drawings to be used for descriptions about the embodiments or the prior art will be simply introduced below.

DETAILED DESCRIPTION

Figure 1A:
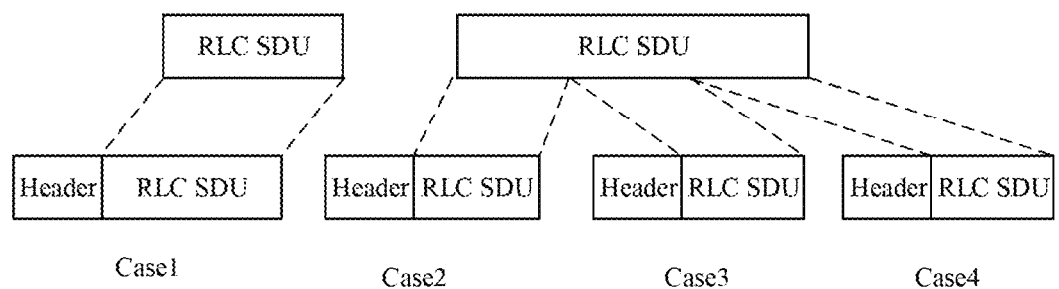
FIG. 1A is a schematic diagram of four cases probably occurring to RLC PDUs in a 5G NR system.
Figure 1B:
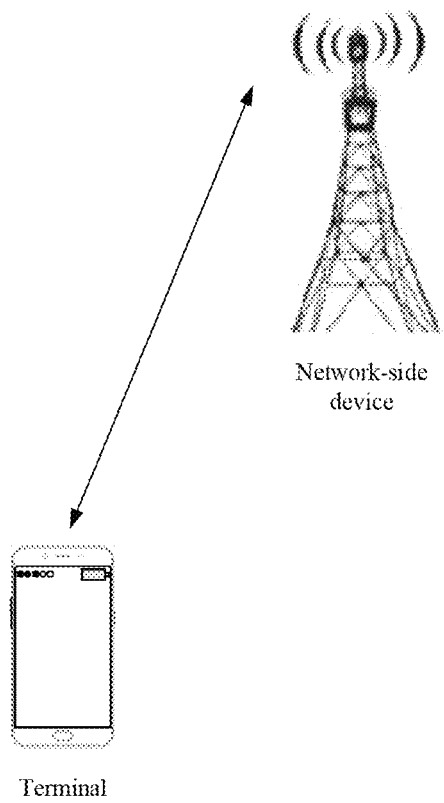
FIG. 1B is a possible network architecture of an exemplary communication system according to an embodiment of the disclosure.

Referring to FIG. 1B, FIG. 1B is a possible network architecture of an exemplary communication system according to an embodiment of the disclosure. The exemplary communication system may be, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Addressing (FDMA) system, an Orthogonal Frequency-Division Multiple Access (OFDMA) system, a Single Carrier FDMA (SC-FDMA) system, a General Packet Radio Service (GPRS) system, an LTE system, a 5G/NR system and another similar communication system. The exemplary communication system specifically includes a network-side device and a terminal. When the terminal accesses a mobile communication network provided by the network-side device, the terminal forms a communication connection connected with the network-side device through a wireless link. Such a communication connection manner may be a single-connection manner or a dual-connection manner or a multi-connection manner. When the communication connection manner is the single-connection manner, the network-side device may be an LTE base station or an NR base station (also called a gNB). When the communication manner is the dual-connection manner (which may specifically be implemented by a Carrier Aggregation (CA) technology or implemented by multiple network-side devices), when the terminal is connected with the multiple network-side devices, the multiple network-side devices include a Master Cell Group (MCG) and Secondary Cell Groups (SCGs), data is transmitted back between the cell groups through backhauls, the MCG may be an LTE base station and the SCGs may be LTE base stations, or, the MCG may be an NR base station and the SCGs may be LTE base stations, or, the MCG may be an NR base station and the SCGs may be NR base stations. A receiving-side RLC entity described in the embodiment of the disclosure may be a terminal or software (for example, a protocol stack) and/or hardware (for example, a modem) in the terminal. Similarly, a sending-side RLC entity may be a network-side device or software (for example, a protocol stack) and/or hardware (for example, a modem) in the network-side device.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as UE, Mobile Stations (MSs), terminal devices and the like in various forms. For convenience of description, the devices mentioned above are collectively referred to as terminals.

In an existing LTE system, each RLC entity may configure different RLC modes according to different configurations of service types, the RLC modes specifically including a Transparent Mode (TM), a UM and an AM. When the RLC modes of the RLC entities are configured to be the AM, a sending-side RLC entity sequentially splices and assembles pre-cached RLC SDUs into a data domain of an RLC PDU at first according to a transmission opportunity and transmittable data packet size notified by a MAC layer, formulates header information corresponding to the data domain according to a protocol requirement, the data domain and the header information forming a complete RLC PDU, and then sends the RLC PDU to a receiving-side RLC entity, the header information of the RLC PDU including an SN, and each time when a new RLC PDU is sent, 1 is added to SN. The receiving-side RLC entity, after receiving some RLC PDUs, is required to send a status report to the sending-side RLC entity according to a feedback mechanism, the status report including the SNs of the RLC PDUs needed to be retransmitted by the sending-side RLC entity. The sending-side RLC entity, after receiving the status report, needs to retransmit the RLC PDUs needed to be retransmitted according to the present transmission opportunity and transmittable data packet size. If the present transmittable data packet size is smaller than a size of the RLC PDUs needed to be retransmitted, the sending-side RLC entity needs to re-segment data domains of the RLC PDUs needed to be retransmitted, formulate corresponding header structures for each segmented data domain to finally form multiple RLC PDU segments, and then send all the formed RLC PDU segments to the receiving-side RLC entity. Of course, the receiving-side RLC entity, after receiving some RLC PDU segments, further needs to send a status report to the sending-side RLC entity according to the feedback mechanism. In such a case, the status report not only includes SNs corresponding to the RLC PDU segments needed to be retransmitted, but also needs to include starting positions and ending positions of the data domains of the RLC PDU segments needed to be transmitted in the data domains of the original RLC PDUs, and some fields are further needed to indicate whether a pair of starting position and ending position of the data domain of the RLC PDU segment needed to be transmitted in the data domain of the original RLC PDU is further included after the present RLC PDU segment needed to be transmitted, such that the sending-side RLC entity may retransmit the RLC PDU segments needed to be transmitted according to the received status report. The sending-side RLC entity sends the RLC PDUs to the receiving-side RLC entity according to the transmittable data size and transmission opportunity notified by a sending-side MAC entity, and the receiving-side RLC entity, after receiving some RLC PDUs sent by the sending-side RLC entity, needs to send a status report to the sending-side RLC entity according to the feedback mechanism, the status report including the SNs of the RLC PDUs needed to be transmitted by the sending-side RLC entity.

In the prior art, PDUs of an RLC layer may be classified into two types: one is data PDUs and the other is control PDUs. RLC PDUs and RLC PDU segments are usually data PDUs, and status reports are control PDUs, namely a data packet sent to a receiving-side RLC entity by a sending-side RLC entity is a data PDU, and a data packet fed back to the sending-side RLC entity by the receiving-side RLC entity is a control PDU.

At first, the technical problem to be solved in the embodiments of the disclosure will be described below in combination with specific application scenarios.

Figure 1C:
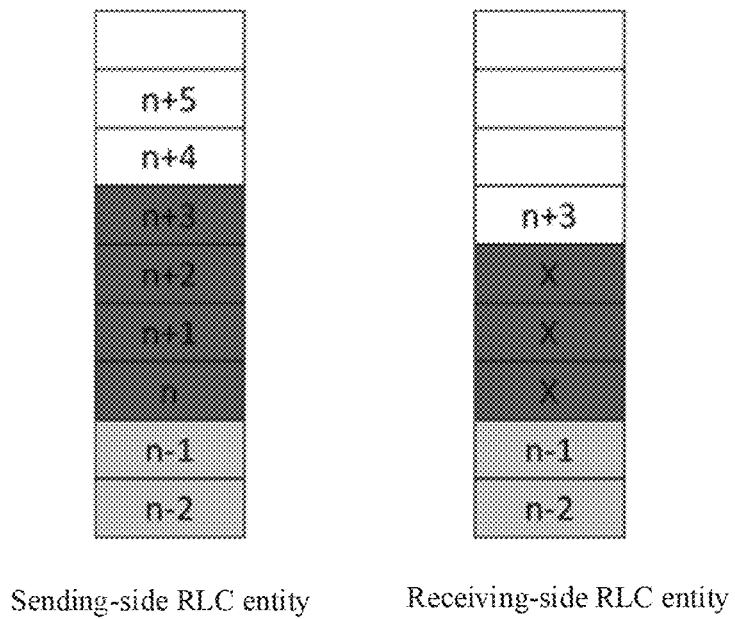
FIG. 1C is a schematic diagram of RLC PDU transmission between a receiving-side RLC entity and a sending-side RLC entity in an existing LTE system.
Figure 1D:
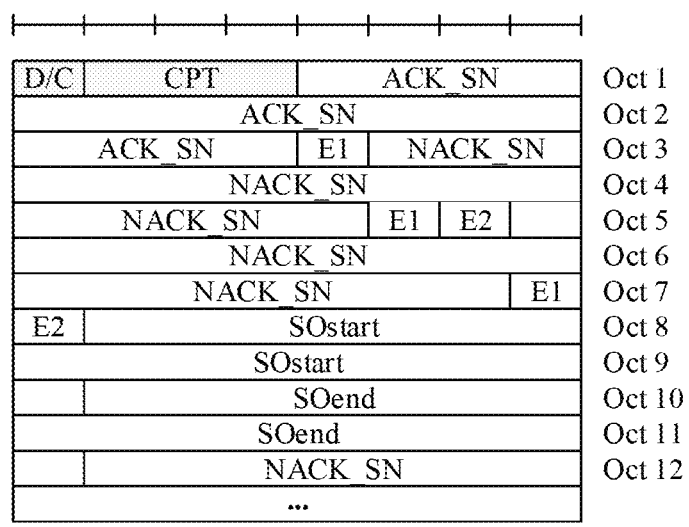
FIG. 1D is a structure diagram of a status report for RLC PDUs in an existing LTE system.

As illustrated in FIG. 1C, in an LTE system, there is made such a hypothesis that a sending-side RLC entity has sent PDUs with SNs n−2 and n−1 to n+5 and it has been acknowledged that the PDUs with the SNs n−2 and n−1 have been successfully received by a receiving-side RLC entity. The receiving-side RLC entity finds that the PDU with the SN n+3 is successfully received but the PDUs with the SNs between n−1 and n+3 are not received, and then the receiving-side RLC entity may send a status report to the sending-side RLC entity to indicate the SNs of the unsuccessfully PDUs. In the example, the status report reported by the receiving-side RLC entity includes the maximum SN of the present successfully received PDUs and the SN of each unsuccessfully received PDU, namely the status report may include the SN n+3 and the unsuccessfully received n, n+1 and n+2. A format example of the status report is illustrated in FIG. 1D (for example, the SN of the PDU is 16 bits), and these reported SNs may occupy an overhead of 4*16 bits. The status report includes a data/control (D/C) domain, a control PDU type (CPT) domain, an Acknowledgement SN (ACK_SN domain, an Extended 1 (E1) domain, a Negative Acknowledgement SN (NACK_SN) domain, an E2 domain, an SOstart domain and an SOend domain. The D/C domain is used to indicate whether a data packet is a data PDU or a control PDU. The CPT domain is used to indicate a type of an RLC PDU. The ACK_SN domain is used to indicate an SN of a next PDU for which no ACK information is received and which is not indicated in the status report as being lost. The E1 domain is used to indicate whether there is a group of NACK_SN domain and E1/E2 combinational domain following the E1 domain. The NACK_SN domain is used to indicate the SN of the RLC PDU needed to be transmitted. The E2 domain is used to indicate whether there is a group of SOstart and SOend combinational domain following the E2 domain. The SOstart domain is used to indicate a starting position of a data domain of the RLC PDU needed to be transmitted in a data domain of an original complete RLC PDU. The SOend domain is used to indicate an ending position of the data domain needed to be transmitted in the data domain of the original complete RLC PDU. All of the domains take byte as a unit.

Figure 1E:
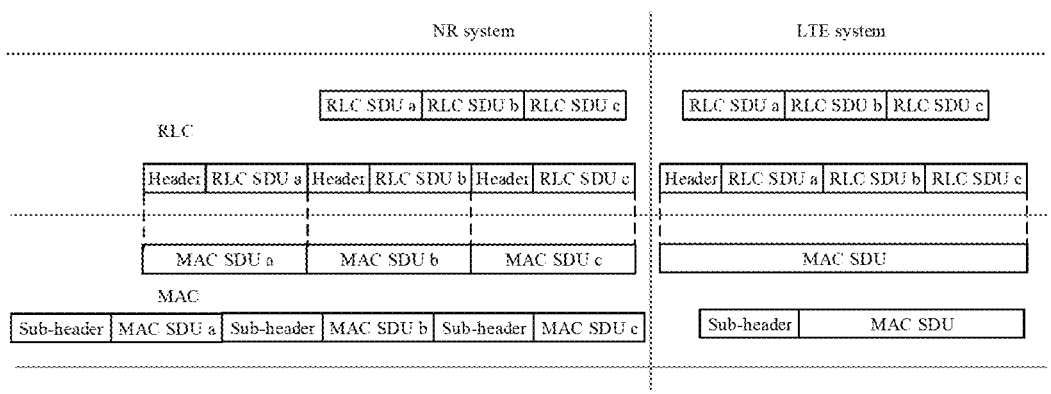
FIG. 1E is a schematic diagram of processing three RLC SDUs to a MAC-layer entity through an LTE system and an NR system respectively according to an embodiment of the disclosure.

As illustrated in FIG. 1E, the condition that three RLC SDUs arrive at a MAC-layer entity through an RLC entity of an LTE system in an AM and an RLC entity of an NR system in the AM and multiplexed into MAC PDUs respectively is described in the example illustrated in the figure. The three RLC SDUs are RLC SDU a, RLC SDU b and RLC SDU c. Since the RLC entity of the NR system in the AM abandons a concatenation function, the three RLC SDUs are processed by the RLC entity of the NR system to correspondingly generate three RLC PDUs respectively, SNs being sequentially SN=1, SN=2 and SN=3. While the RLC entity of the LTE system has the concatenation function, and if the three SDUs may right be concatenated, only one RLC PDU with an SN 1 is generated after processing by the RLC entity of the LTE system. There is further made such a hypothesis that, if an error occurs to a physical channel bearing an RLC PDU, retransmission of an RLC layer is needed to be triggered. For the NR system, the receiving-side RLC entity needs to report the three SNs, i.e., SN=1, SN=2 and SN=3. For the LTE system, because of the concatenation function, the receiving-side RLC entity merely needs to report the corresponding SN, i.e., SN=1. From the view of overhead, after RLC concatenation is abandoned, a status report sent to the sending-side RLC entity by the receiving-side RLC entity in the NR system needs to include a large amount of SN indication information, and then the sending-side RLC entity may correctly retransmit an RLC PDU needed to be transmitted, which brings the problem of relatively high status report feedback overhead of the RLC entity.

Based on the technical problem, the embodiments of the disclosure disclose a method for RLC transmission. A receiving-side RLC entity, responsive to determining that multiple RLC PDUs in a first RLC PDU set are not successfully received after receiving the first RLC PDU set generated according to raw data segment from a sending-side RLC entity, sends a status report only including an indication domain for SNs of the multiple RLC PDUs to the sending-side RLC entity, then the sending-side RLC entity generates a second RLC PDU set according to the status report and sends it to the receiving-side RLC entity, and the receiving-side RLC entity may acquire the raw data segment according to the first RLC PDU set and the second RLC PDU set. In such a manner, the receiving-side RLC PDU, responsive to determining that the multiple RLC PDUs in the first RLC PDU set are not successfully received, sends the status report only including the indication domain for the SNs of the multiple RLC PDUs to the sending-side RLC entity, thus reducing an overhead in status report feedback to the sending-side RLC entity. Therefore, the problem of relatively high overhead in status report feedback of a receiving-side RLC entity requiring a sending-side RLC entity to retransmit an RLC PDU to the sending-side RLC entity in a 5G NR system is solved.

The technical solutions in the embodiments of the disclosure will be described below in combination with the drawings in detail.

Figure 2:
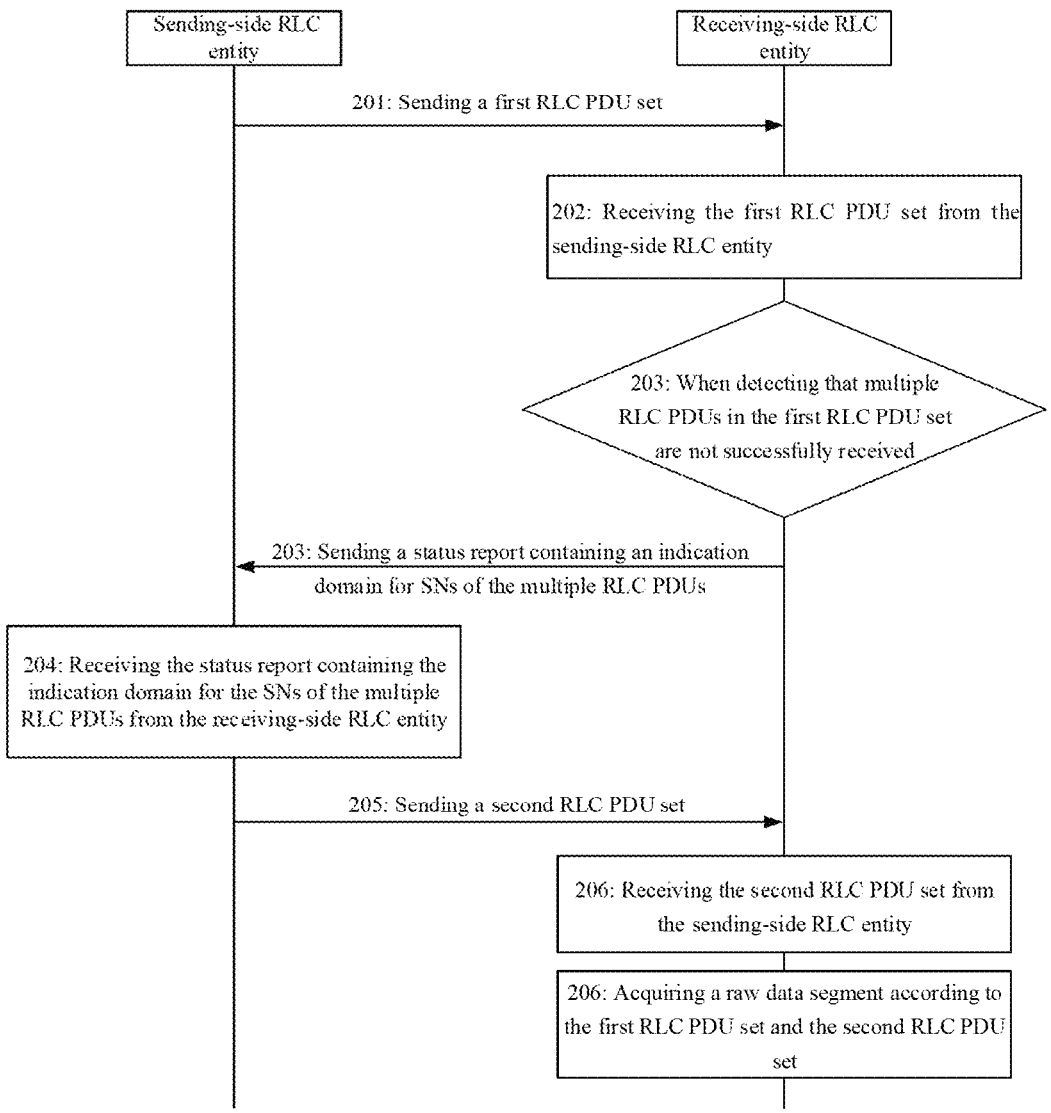
FIG. 2 is a communication schematic diagram of a method for RLC transmission according to an embodiment of the disclosure.

Referring to FIG. 2, FIG. 2 is a flowchart of a method for RLC transmission according to an embodiment of the disclosure. The method includes the following operations.

In 201, a sending-side RLC entity sends a first RLC PDU set to a receiving-side RLC entity. Here, the first RLC PDU set is generated according to a raw data segment.

The raw data segment may be an RLC SDU.

In 202, the receiving-side RLC entity receives the first RLC PDU set from the sending-side RLC entity. The first RLC PDU set is generated by the sending-side RLC entity according to the raw data segment.

In 203, the receiving-side RLC entity, responsive to detecting that multiple RLC PDUs in the first RLC PDU set are not successfully received, send a status report containing an indication domain for SNs of the multiple RLC PDUs.

In 204, the sending-side RLC entity receives the status report containing the indication domain for the SNs of the multiple RLC PDUs from the receiving-side RLC entity. The status report is sent by the receiving-side RLC entity responsive to detecting that the multiple RLC PDUs in the first RLC PDU set are not successfully received.

The status report may be a status PDU.

In 205, the sending-side RLC entity sends a second RLC PDU set to the receiving-side RLC entity. The first RLC PDU set and the second RLC PDU set are used to acquire the raw data segment.

The sending-side RLC entity, after receiving the status report, may determine the multiple RLC PDUs needed to be transmitted according to the indication domain in the status report, and generate the second RLC PDU set at least containing the multiple RLC PDUs.

In 206, the receiving-side RLC entity receives the second RLC PDU set from the sending-side RLC entity.

In 207, the receiving-side RLC entity acquires the raw data segment according to the first RLC PDU set and the second RLC PDU set.

It can be seen that, in the embodiment of the disclosure, the receiving-side RLC entity, responsive to determining that the multiple RLC PDUs in the first RLC PDU set are not successfully received after receiving the first RLC PDU set generated according to the raw data segment from the sending-side RLC entity, sends the status report only including the indication domain for the SNs of the multiple RLC PDUs to the sending-side RLC entity, then the sending-side RLC entity generates the second RLC PDU set according to the status report and sends it to the receiving-side RLC entity, and the receiving-side RLC entity may acquire the raw data segment according to the first RLC PDU set and the second RLC PDU set. In such a manner, the receiving-side RLC PDU, responsive to determining that the multiple RLC PDUs in the first RLC PDU set are not successfully received, sends the status report only including the indication domain for the SNs of the multiple RLC PDUs to the sending-side RLC entity, thus reducing an overhead in status report feedback to the sending-side RLC entity. Therefore, the problem of relatively high overhead in status report feedback of a receiving-side RLC entity requiring a sending-side RLC entity to retransmit an RLC PDU to the sending-side RLC entity in a 5G NR system is solved.

In a possible example, the multiple RLC PDUs include N segments of continuous RLC PDUs, and the number of the RLC PDUs in each segment of continuous RLC PDUs is smaller than a preset number threshold, N is a positive integer; the indication domain for the SNs of the multiple RLC PDUs includes N NACK_SN_RANGE domains; and the status report further includes one CPT domain and N NACK_SN domains.

A bit length of the NACK_SN_RANGE domain is smaller than a bit length of the NACK_SN domain.

The CPT domain is used to indicate that the status report includes the NACK_SN_RANGE domains. The N NACK_SN_RANGE domains and the N NACK_SN domains form N combinational domains. The N combinational domains include no repeated domains. Each combinational domain includes a NACK_SN domain and a NACK_SN_RANGE domain. Each combinational domain is used to indicate the SNs of the RLC PDUs in the corresponding segment of continuous RLC PDUs. The NACK_SN domain in each combinational domain is used to indicate the maximum or minimum SN in the corresponding segment of continuous RLC PDUs. The NACK_SN_RANGE domain in each combinational domain is used to indicate the number of the RLC PDUs in the corresponding segment of continuous RLC PDUs.

It can be seen that, in the example, since each NACK_SN_RANGE domain in the N NACK_SN_RANGE domains may indicate the SNs of the corresponding segment of continuous RLC PDUs, a data size of indication information may be reduced, and transmission efficiency of the status report is further improved.

In a possible example, the multiple RLC PDUs are N segments of continuous RLC PDUs, and the number of the RLC PDUs in each segment of continuous RLC PDUs is greater than the preset number threshold, N is a positive integer; the indication domain for the SNs of the multiple RLC PDUs refers to N NACK_SN_END domains; and the status report further includes a CPT domain and N NACK_SN domains.

The CPT domain is used to indicate that the status report includes the NACK_SN_END domains. The N NACK_SN_END domains and the N NACK_SN domains form N combinational domains. The N combinational domains include no repeated domains. Each combinational domain includes a NACK_SN domain and a NACK_SN_END domain. Each combinational domain is used to indicate the SNs of the RLC PDUs in the corresponding segment of continuous RLC PDUs. The NACK_SN domain in each combinational domain is used to indicate the maximum SN in the corresponding segment of continuous RLC PDUs, and the NACK_SN_END domain in the combinational domain is used to indicate the minimum SN in the corresponding segment of continuous RLC PDUs. Or, the NACK_SN domain in each combinational domain is used to indicate the minimum SN in the corresponding segment of continuous RLC PDUs, and the ANCK_SN_END domain in the combinational domain is used to indicate the maximum SN in the corresponding segment of continuous RLC PDUs.

It can be seen that, in the example, since each NACK_SN_END domain in the N NACK_SN_END domains may indicate the SNs of the corresponding segment of continuous RLC PDUs, an overhead in indication information for the SNs of the successfully received RLC PDUs may be reduced, and improvement in the transmission efficiency of the status report is facilitated.

In a possible example, the multiple RLC PDUs include at least one discontinuous RLC PDU; the indication domain for the SNs of the multiple RLC PDUs is a bitmap domain; and the status report further includes one CPT domain and one NACK_SN domain.

A bit length of the bitmap domain is a variable bit length, and the bit length may be a difference value between the SN indicated by the NACK_SN domain in the present status report and an SN indicated by an ACK_SN domain in a previous status report.

The CPT domain is used to indicate that the status report includes the bitmap domain. The NACK_SN domain is used to indicate the maximum or minimum SN in the multiple RLC PDUs. The bitmap domain includes M bits, the M bits correspond to M continuous RLC PDUs. The M RLC PDUs and the RLC PDU indicated by the NACK_SN domain at least include the multiple RLC PDUs, each bit is used to indicate whether the corresponding RLC PDU is successfully received. The RLC PDU indicated by the NACK_SN domain is adjacent to the M RLC PDUs, where M is a positive integer.

It can be seen that, in the example, since each bit in the bitmap domain correspondingly indicates an RLC PDU, an overhead in indication information for the SNs of the unsuccessfully received RLC PDUs may be reduced, and improvement in the transmission efficiency of the status report is facilitated.

In a possible example, the status report further includes a D/C domain, an E1 domain, an E2 domain and an E3 domain. The E1 domain is used to indicate whether there is any NACK_SN domain, ACK_SN_RANGE domain, E1 domain, E2 domain and E3 domain following the E1 domain. The E2 domain is used to indicate whether there is any NACK_SN_RANGE domain following the E2 domain. The E3 domain is used to indicate whether there is any SOstart domain and SOend domain following the E3 domain.

In a possible example, the status report further includes an ACK_SN domain, an SOstart domain and an SOend domain.

The embodiment of the disclosure will specifically be described below in combination with a specific application scenario.

Figures 3A, 3B:
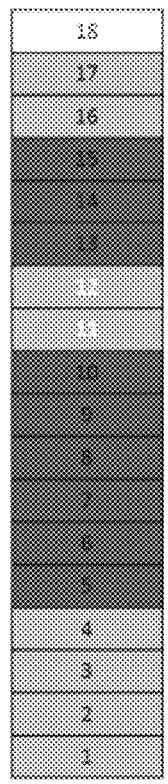
FIG. 3A is a schematic diagram illustrating that UE receives RLC PDUs in a first RLC PDU set in a 5G NR scenario according to an embodiment of the disclosure.
FIG. 3B is a structure diagram of a status report according to an embodiment of the disclosure.

If the sending-side RLC entity is a protocol stack of a gNB in 5G NR, the receiving-side RLC entity is a protocol stack of UE in 5G NR, the status report includes the CPT domain, the E1 domain, the E2 domain, the E3 domain and a Reserved (R) domain. A correspondence relationship between a value and indicated information of the CPT domain is illustrated in Table 1, a correspondence relationship between a value and indicated information of the E1 domain is illustrated in Table 2, a correspondence relationship between a value and indicated information of the E2 domain is illustrated in Table 3, a correspondence relationship between a value and indicated information of the E3 domain is illustrated in Table 4. The R domain is a reserved field, the first RLC PDU set includes RLC PDUs with SNs 1 to 18, the UE receives the RLC PDUs in the first RLC PDU set. As illustrated in FIG. 3A, the SNs of the successfully received RLC PDUs are {1/2/3/4, 11/12, 16/17}, and the SNs of the unsuccessfully received RLC PDUs are {5/6/7/8/9/10, 13/14/15}. That is, the nine RLC PDUs that are not successfully received by the UE include two segments of continuous RLC PDUs, specifically a first segment of continuous RLC PDUs (the corresponding SNs are 5/6/7/8/9/10) and a second segment of continuous RLC PDUs (the corresponding SNs are 13/14/15). The number of the RLC PDUs in each segment of continuous RLC PDUs is smaller than a preset number threshold 10, the UE determines that the status report includes two NACK_SN_RANGE domains and two NACK_SN domains, which form two combinational domains {NACK_SN domain 1, NACK_SN_RANGE domain 1} and {NACK_SN domain 2, NACK_SN_RANGE domain 2}, the NACK_SN domain 1 is used to indicate the maximum SN 15 in the corresponding first segment of continuous RLC PDUs, the NACK_SN_RANGE domain 1 is used to indicate the number 6 of the RLC PDUs in the corresponding first segment of continuous RLC PDUs, the NACK_SN domain 2 is used to indicate the maximum SN 10 in the corresponding second segment of continuous RLC PDUs, and the NACK_SN_RANGE domain 2 is used to indicate the number 3 of the RLC PDUs in the corresponding second segment of continuous RLC PDUs. Therefore, a format example of the status report is illustrated in FIG. 3B.

TABLE 1

| CPT domain | Indicated information |
| --- | --- |
| 000 | Indicating that the status report includes the NACK_SN_RANGE domain |
| 001 | Indicating that the status report includes the bitmap domain |
| 010 | Indicating that the status report includes the NACK_SN_END domain |

TABLE 2

| E1 domain | Indicated information |
| --- | --- |
| 0 | Indicating that there is no NACK_SN domain, ACK_SN_RANGE domain, E1 domain, E2 domain or E3 domain following E1 domain |
| 1 | Indicating that there is a NACK_SN domain, ACK_SN_RANGE domain, E1 domain, E2 domain and E3 domain following E1 domain |

TABLE 3

| E2 domain | Indicated information |
| --- | --- |
| 0 | Indicating that there is no NACK_SN_RANGE domain following E2 domain |
| 1 | Indicating that there is a NACK_SN_RANGE domain following E2 domain |

TABLE 4

| E3 domain | Indicated information |
| --- | --- |
| 0 | Indicating that there is no SOstart domain and SOend domain following E3 domain |
| 1 | Indicating that there is an SOstart domain and SOend domain following E3 domain |

Figures 3C, 3D:
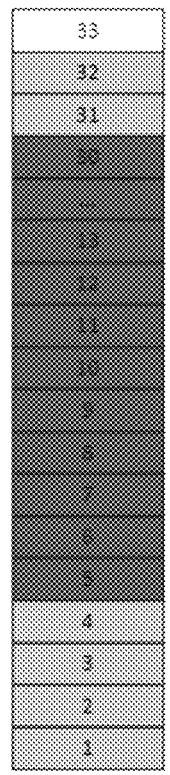
FIG. 3C is a schematic diagram illustrating that UE receives RLC PDUs in a first RLC PDU set in another 5G NR scenario according to an embodiment of the disclosure.
FIG. 3D is a structure diagram of another status report according to an embodiment of the disclosure.

If the sending-side RLC entity is the protocol stack of the gNB in 5G NR, the receiving-side RLC entity is the protocol stack of the UE in 5G NR, the status report includes the CPT domain, the E1 domain, the E2 domain, the E3 domain and the R domain. The correspondence relationship between the value and indicated information of the CPT domain is illustrated in Table 1, the correspondence relationship between the value and indicated information of the E1 domain is illustrated in Table 2, the correspondence relationship between the value and indicated information of the E2 domain is illustrated in Table 3, and the correspondence relationship between the value and indicated information of the E3 domain is illustrated in Table 4. The R domain is a reserved field, the first RLC PDU set includes RLC PDUs with SNs 1 to 32, the UE receives the RLC PDUs in the first RLC PDU set. As illustrated in FIG. 3C, the SNs of the successfully received RLC PDUs are {1/2/3/4, 31/32} and the SNs of the unsuccessfully received RLC PDUs are {5/6/7/8/9/10/30}. That is, the 26 RLC PDUs that are not successfully received by the UE include a segment of continuous RLC PDUs, the number of the RLC PDUs in the continuous RLC PDUs is greater than the preset number threshold 10. The UE determines that the status report includes a NACK_SN_END domain and a NACK_SN domain, which form a combinational domain {NACK_SN domain, NACK_SN_END domain}. The NACK_SN domain is used to indicate the maximum SN 30 in the corresponding continuous RLC PDUs, and the NACK_SN_END domain is used to indicate the number 26 of the RLC PDUs in the corresponding continuous RLC PDUs. Therefore, a format example of the status report is illustrated in FIG. 3D.

Figures 3E, 3F:
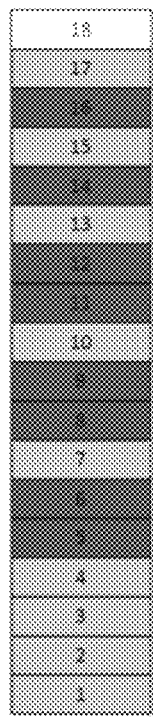
FIG. 3E is a schematic diagram illustrating that a User Equipment (UE) receives RLC PDUs in a first RLC PDU set in another 5G NR scenario according to an embodiment of the disclosure.
FIG. 3F is a structure diagram of another status report according to an embodiment of the disclosure.

If the sending-side RLC entity is the protocol stack of the gNB in 5G NR, the receiving-side RLC entity is the protocol stack of the UE in 5G NR, the status report includes the CPT domain, the E1 domain, the E2 domain, the E3 domain and the R domain. The correspondence relationship between the value and indicated information of the CPT domain is illustrated in Table 1, the correspondence relationship between the value and indicated information of the E1 domain is illustrated in Table 2, the correspondence relationship between the value and indicated information of the E2 domain is illustrated in Table 3, the correspondence relationship between the value and indicated information of the E3 domain being illustrated in Table 4. The R domain is a reserved field, the first RLC PDU set includes RLC PDUs with SNs 1 to 17, the UE receives the RLC PDUs in the first RLC PDU set. As illustrated in FIG. 3E, the SNs of the successfully received RLC PDUs are {1/2/3/4, 7, 10, 13, 15, 17} and the SNs of the unsuccessfully received RLC PDUs are {5/6, 8/9, 11/12, 14, 16}. That is, the 8 RLC PDUs that are not successfully received by the UE include two discontinuous RLC PDUs (the corresponding SNs are 14 and 16), the UE determines that the status report includes a bitmap domain and a NACK_SN domain. The NACK_SN domain is used to indicate the maximum SN 16 in the unsuccessfully received RLC PDUs. The bitmap domain includes 11 bits, the 11 bits correspond to the 11 RLC PDUs with the SNs 15 to 5, the 11 RLC PDUs and the PDU with the SN 16 include all the unsuccessfully received RLC PDUs, and each bit is used to indicate whether the corresponding RLC PDU is successfully received. Therefore, a format example of the status report is illustrated in FIG. 3F.

The format diagrams of the status report provided in the embodiment of the disclosure are only adopted to describe the necessary domains to be included in the status report and a length of each domain is not specifically limited. The length of each domain illustrated in FIGS. 3B, 3D and 3F is only schematic. That is, types of the domains in the status report and the length of each domain are not specifically limited in the embodiment of the disclosure, and the types of the domains in the status report and the length of each domain may specifically be set according to a requirement of a practical application scenario.

Figure 4:
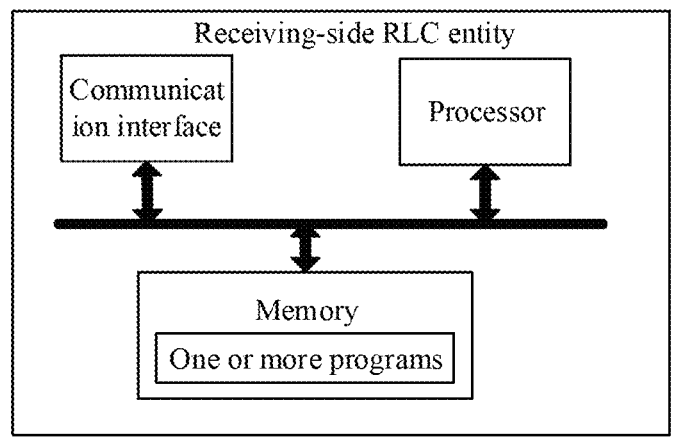
FIG. 4 is a structure diagram of a receiving-side RLC entity according to an embodiment of the disclosure.

Consistent with the embodiment illustrated in FIG. 2, FIG. 4 is a structure diagram of a receiving-side RLC entity according to an embodiment of the disclosure. As illustrated in the figure, the receiving-side RLC entity includes a processor, a memory, a communication interface and one or more programs. The one or more programs are stored in the memory and are configured to be executed by the processor. The programs include instructions configured to execute the following steps.

A first RLC PDU set is received from a sending-side RLC entity. Here, the first RLC PDU set is generated by the sending-side RLC entity according to a raw data segment.

Responsive to detecting that multiple RLC PDUs in the first RLC PDU set are not successfully received, a status report containing an indication domain for SNs of the multiple RLC PDUs.

A second RLC PDU set is received from the sending-side RLC entity.

The raw data segment is acquired according to the first RLC PDU set and the second RLC PDU set.

It can be seen that, in the embodiment of the disclosure, the receiving-side RLC entity, responsive to determining that the multiple RLC PDUs in the first RLC PDU set are not successfully received after receiving the first RLC PDU set generated according to the raw data segment from the sending-side RLC entity, sends the status report only including the indication domain for the SNs of the multiple RLC PDUs to the sending-side RLC entity, then the sending-side RLC entity generates the second RLC PDU set according to the status report and sends it to the receiving-side RLC entity, and the receiving-side RLC entity may acquire the raw data segment according to the first RLC PDU set and the second RLC PDU set. In such a manner, the receiving-side RLC PDU, responsive to determining that the multiple RLC PDUs in the first RLC PDU set are not successfully received, sends the status report only including the indication domain for the SNs of the multiple RLC PDUs to the sending-side RLC entity, thus reducing an overhead in status report feedback to the sending-side RLC entity. Therefore, the problem of relatively high overhead in status report feedback of a receiving-side RLC entity requiring a sending-side RLC entity to retransmit an RLC PDU to the sending-side RLC entity in a 5G NR system is solved.

In a possible example, the multiple RLC PDUs include N segments of continuous RLC PDUs, and the number of the RLC PDUs in each segment of continuous RLC PDUs is smaller than a preset number threshold, N is a positive integer; the indication domain for the SNs of the multiple RLC PDUs includes N NACK_SN_RANGE domains; and the status report further includes one CPT domain and N NACK_SN domains.

The CPT domain is used to indicate that the status report includes the NACK_SN_RANGE domains. The N NACK_SN_RANGE domains and the N NACK_SN domains form N combinational domains, the N combinational domains include no repeated domains, each combinational domain includes a NACK_SN domain and a NACK_SN_RANGE domain. Each combinational domain is used to indicate the SNs of the RLC PDUs in the corresponding segment of continuous RLC PDUs. The NACK_SN domain in each combinational domain is used to indicate the maximum or minimum SN in the corresponding segment of continuous RLC PDUs, and the NACK_SN_RANGE domain in each combinational domain is used to indicate the number of the RLC PDUs in the corresponding segment of continuous RLC PDUs.

In a possible example, the multiple RLC PDUs are N segments of continuous RLC PDUs, and the number of the RLC PDUs in each segment of continuous RLC PDUs is greater than the preset number threshold, N is a positive integer; the indication domain for the SNs of the multiple RLC PDUs includes N NACK_SN_END domains; and the status report further includes one CPT domain and N NACK_SN domains.

The CPT domain is used to indicate that the status report includes the NACK_SN_END domains. The N NACK_SN_END domains and the N NACK_SN domains form N combinational domains. The N combinational domains include no repeated domains. Each combinational domain includes a NACK_SN domain and a NACK_SN_END domain. Each combinational domain is used to indicate the SNs of the RLC PDUs in the corresponding segment of continuous RLC PDUs. The NACK_SN domain in each combinational domain is used to indicate the maximum SN in the corresponding segment of continuous RLC PDUs, and the NACK_SN_END domain in the combinational domain is used to indicate the minimum SN in the corresponding segment of continuous RLC PDUs. Or, the NACK_SN domain in each combinational domain is used to indicate the minimum SN in the corresponding segment of continuous RLC PDUs, and the ANCK_SN_END domain in the combinational domain is used to indicate the maximum SN in the corresponding segment of continuous RLC PDUs.

In a possible example, the multiple RLC PDUs include at least one discontinuous RLC PDU; the indication domain for the SNs of the multiple RLC PDUs refers to a bitmap domain; and the status report further includes one CPT domain and one NACK_SN domain.

The CPT domain is used to indicate that the status report includes the bitmap domain. The NACK_SN domain is used to indicate the maximum or minimum SN in the multiple RLC PDUs. The bitmap domain includes M bits, the M bits correspond to M continuous RLC PDUs. The M RLC PDUs and the RLC PDU indicated by the NACK_SN domain at least include the multiple RLC PDUs, each bit is used to indicate whether the corresponding RLC PDU is successfully received. The RLC PDU indicated by the NACK_SN domain is adjacent to the M RLC PDUs, where M is a positive integer.

In a possible example, the status report further includes a D/C domain, an E1 domain, an E2 domain and an E3 domain, the E1 domain is used to indicate whether there is any NACK_SN domain, ACK_SN_RANGE domain, E1 domain, E2 domain and E3 domain following the E1 domain, the E2 domain is used to indicate whether there is any NACK_SN_RANGE domain following the E2 domain, and the E3 domain is used to indicate whether there is any SOstart domain and SOend domain following the E3 domain.

In a possible example, the status report further includes an ACK_SN domain, an SOstart domain and an SOend domain.

Figure 5:
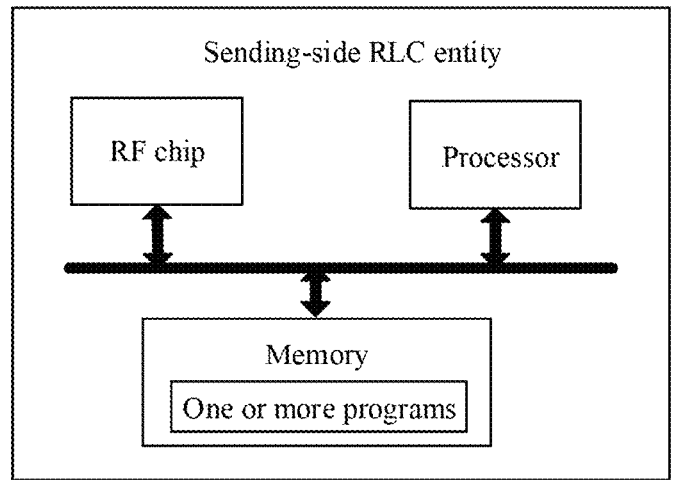
FIG. 5 is a structure diagram of a sending-side RLC entity according to an embodiment of the disclosure.

Consistent with the embodiment illustrated in FIG. 2, FIG. 5 is a structure diagram of a sending-side RLC entity according to an embodiment of the disclosure. As illustrated in the figure, the sending-side RLC entity includes a processor, a memory, an RF chip and one or more programs. The one or more programs are stored in the memory and are configured to be executed by the processor. The programs include instructions configured to execute the following steps.

A first RLC PDU set is sent to a receiving-side RLC entity. The first RLC PDU set is generated according to a raw data segment.

A status report containing an indication domain for SNs of multiple RLC PDUs is received from the receiving-side RLC entity. The status report is sent by the receiving-side RLC entity responsive to detecting that the multiple RLC PDUs in the first RLC PDU set are not successfully received.

A second RLC PDU set is sent to the receiving-side RLC entity. The first RLC PDU set and the second RLC PDU set are used to acquire the raw data segment.

It can be seen that, in the embodiment of the disclosure, the receiving-side RLC entity, responsive to determining that the multiple RLC PDUs in the first RLC PDU set are not successfully received after receiving the first RLC PDU set generated according to the raw data segment from the sending-side RLC entity, sends the status report only including the indication domain for the SNs of the multiple RLC PDUs to the sending-side RLC entity, then the sending-side RLC entity generates the second RLC PDU set according to the status report and sends it to the receiving-side RLC entity, and the receiving-side RLC entity may acquire the raw data segment according to the first RLC PDU set and the second RLC PDU set. In such a manner, the receiving-side RLC PDU, responsive to determining that the multiple RLC PDUs in the first RLC PDU set are not successfully received, sends the status report only including the indication domain for the SNs of the multiple RLC PDUs to the sending-side RLC entity to reduce an overhead in status report feedback to the sending-side RLC entity. Therefore, the problem of relatively high overhead in status report feedback of a receiving-side RLC entity requiring a sending-side RLC entity to retransmit an RLC PDU to the sending-side RLC entity in a 5G NR system is solved.

In a possible example, the multiple RLC PDUs include N segments of continuous RLC PDUs, and the number of the RLC PDUs in each segment of continuous RLC PDUs is smaller than a preset number threshold, N is a positive integer; the indication domain for the SNs of the multiple RLC PDUs includes N NACK_SN_RANGE domains; and the status report further includes one CPT domain and N NACK_SN domains.

The CPT domain is used to indicate that the status report includes the NACK_SN_RANGE domains. The N NACK_SN_RANGE domains and the N NACK_SN domains form N combinational domains. The N combinational domains include no repeated domains. Each combinational domain includes a NACK_SN domain and a NACK_SN_RANGE domain. Each combinational domain is used to indicate the SNs of the RLC PDUs in the corresponding segment of continuous RLC PDUs. The NACK_SN domain in each combinational domain is used to indicate the maximum or minimum SN in the corresponding segment of continuous RLC PDUs, and the NACK_SN_RANGE domain in each combinational domain is used to indicate the number of the RLC PDUs in the corresponding segment of continuous RLC PDUs.

In a possible example, the multiple RLC PDUs are N segments of continuous RLC PDUs, and the number of the RLC PDUs in each segment of continuous RLC PDUs is greater than the preset number threshold, N is a positive integer; the indication domain for the SNs of the multiple RLC PDUs includes N NACK_SN_END domains; and the status report further includes one CPT domain and N NACK_SN domains.

The CPT domain is used to indicate that the status report includes the NACK_SN_END domains. The N NACK_SN_END domains and the N NACK_SN domains form N combinational domains. The N combinational domains include no repeated domains. Each combinational domain includes a NACK_SN domain and a NACK_SN_END domain. Each combinational domain is used to indicate the SNs of the RLC PDUs in the corresponding segment of continuous RLC PDUs. The NACK_SN domain in each combinational domain is used to indicate the maximum SN in the corresponding segment of continuous RLC PDUs, and the NACK_SN_END domain in the combinational domain is used to indicate the minimum SN in the corresponding segment of continuous RLC PDUs. Or, the NACK_SN domain in each combinational domain is used to indicate the minimum SN in the corresponding segment of continuous RLC PDUs, and the ANCK_SN_END domain in the combinational domain is used to indicate the maximum SN in the corresponding segment of continuous RLC PDUs.

In a possible example, the multiple RLC PDUs include at least one discontinuous RLC PDU; the indication domain for the SNs of the multiple RLC PDUs is a bitmap domain; and the status report further includes one CPT domain and one NACK_SN domain.

The CPT domain is used to indicate that the status report includes the bitmap domain. The NACK_SN domain is used to indicate the maximum or minimum SN in the multiple RLC PDUs. The bitmap domain includes M bits, the M bits correspond to M continuous RLC PDUs. The M RLC PDUs and the RLC PDU indicated by the NACK_SN domain at least include the multiple RLC PDUs, each bit is used to indicate whether the corresponding RLC PDU is successfully received. The RLC PDU indicated by the NACK_SN domain is adjacent to the M RLC PDUs, and M is a positive integer.

In a possible example, the status report further includes a D/C domain, an E1 domain, an E2 domain and an E3 domain, the E1 domain is used to indicate whether there is any NACK_SN domain, ACK_SN_RANGE domain, E1 domain, E2 domain and E3 domain following the E1 domain, the E2 domain is used to indicate whether there is any NACK_SN_RANGE domain following the E2 domain, and the E3 domain is used to indicate whether there is any SOstart domain and SOend domain following the E3 domain.

In a possible example, the status report further includes an ACK_SN domain, an SOstart domain and an SOend domain.

The solutions of the embodiments of the disclosure are introduced mainly from the view of interaction between each network element. It can be understood that, for realizing the functions, the receiving-side RLC entity and the sending-side RLC entity include corresponding hardware structures and/or software modules executing each function. Those skilled in the art may easily realize that the units and algorithm steps of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the receiving-side RLC entity and the sending-side RLC entity may be divided according to the abovementioned method examples. For example, functional units may be divided according to the functions, and two or more than two functions may also be integrated into a processing unit. The integrated unit may be implemented in a hardware form or may be implemented in form of software program module. It is to be noted that division of the units in the embodiment of the disclosure is schematic and only logical function division and another division manner may be adopted during practical implementation.

Figure 6:
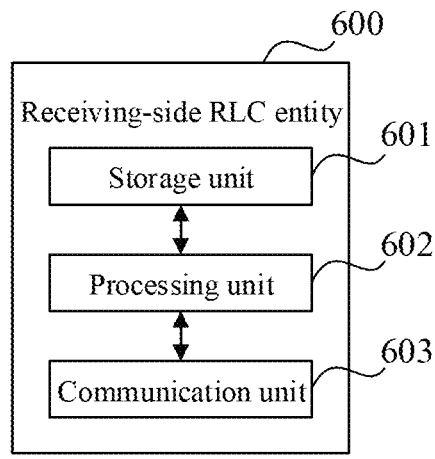
FIG. 6 is a block diagram of functional units of a receiving-side RLC entity according to an embodiment of the disclosure.

Under the condition that an integrated unit is adopted, FIG. 6 is a possible block diagram of functional units of a receiving-side RLC entity involved in the abovementioned embodiments. The receiving-side RLC entity 600 includes a processing unit 602 and a communication unit 603. The processing unit 602 is configured to control and manage operations of the receiving-side RLC entity. For example, the processing unit 602 is configured to support the receiving-side RLC entity to execute 201 to 203 in FIG. 2 and/or is configured for another process of the technology described in the disclosure. The communication unit 603 is configured to support communication between the receiving-side RLC entity and another device, for example, communication with the sending-side RLC entity illustrated in FIG. 5. The receiving-side RLC entity may further include a storage unit 601, configured to store a program code and data of the receiving-side RLC entity.

The processing unit 602 is configured to receive, through the communication unit 603, a first RLC PDU set from a sending-side RLC entity. Here, the first RLC PDU set is generated by the sending-side RLC entity according to a raw data segment. The processing unit 602 is further configured to, responsive to detecting that multiple RLC PDUs in the first RLC PDU set are not successfully received, send, through the communication unit 603, a status report containing an indication domain for SNs of the multiple RLC PDUs. The processing unit 602 is further configured to receive, through the communication unit 603, a second RLC PDU set from the sending-side RLC entity, and is configured to acquire the raw data segment according to the first RLC PDU set and the second RLC PDU set.

In a possible example, the multiple RLC PDUs include N segments of continuous RLC PDUs, and the number of the RLC PDUs in each segment of continuous RLC PDUs is smaller than a preset number threshold, N is a positive integer. The indication domain for the SNs of the multiple RLC PDUs includes N NACK_SN_RANGE domains; and the status report further includes one CPT domain and N NACK_SN domains.

The CPT domain is used to indicate that the status report includes the NACK_SN_RANGE domains. The N NACK_SN_RANGE domains and the N NACK_SN domains form N combinational domains. The N combinational domains include no repeated domains. Each combinational domain includes a NACK_SN domain and a NACK_SN_RANGE domain. Each combinational domain is used to indicate the SNs of the RLC PDUs in the corresponding segment of continuous RLC PDUs. The NACK_SN domain in each combinational domain is used to indicate the maximum or minimum SN in the corresponding segment of continuous RLC PDUs, and the NACK_SN_RANGE domain in each combinational domain is used to indicate the number of the RLC PDUs in the corresponding segment of continuous RLC PDUs.

In a possible example, the multiple RLC PDUs are N segments of continuous RLC PDUs, and the number of the RLC PDUs in each segment of continuous RLC PDUs is greater than the preset number threshold, N is a positive integer; the indication domain for the SNs of the multiple RLC PDUs includes N NACK_SN_END domains; and the status report further includes one CPT domain and N NACK_SN domains.

The CPT domain is used to indicate that the status report includes the NACK_SN_END domains. The N NACK_SN_END domains and the N NACK_SN domains form N combinational domains, the N combinational domains include no repeated domains. Each combinational domain includes a NACK_SN domain and a NACK_SN_END domain. Each combinational domain is used to indicate the SNs of the RLC PDUs in the corresponding segment of continuous RLC PDUs. The NACK_SN domain in each combinational domain is used to indicate the maximum SN in the corresponding segment of continuous RLC PDUs, and the NACK_SN_END domain in the combinational domain is used to indicate the minimum SN in the corresponding segment of continuous RLC PDUs. Or, the NACK_SN domain in each combinational domain is used to indicate the minimum SN in the corresponding segment of continuous RLC PDUs, and the ANCK_SN_END domain in the combinational domain is used to indicate the maximum SN in the corresponding segment of continuous RLC PDUs.

In a possible example, the multiple RLC PDUs include at least one discontinuous RLC PDU; the indication domain for the SNs of the multiple RLC PDUs is a bitmap domain; and the status report further includes one CPT domain and one NACK_SN domain.

The CPT domain is used to indicate that the status report includes the bitmap domain. The NACK_SN domain is used to indicate the maximum or minimum SN in the multiple RLC PDUs. The bitmap domain includes M bits, the M bits correspond to M continuous RLC PDUs. The M RLC PDUs and the RLC PDU indicated by the NACK_SN domain at least include the multiple RLC PDUs, each bit is used to indicate whether the corresponding RLC PDU is successfully received. The RLC PDU indicated by the NACK_SN domain is adjacent to the M RLC PDUs, and M is a positive integer.

In a possible example, the status report further includes a D/C domain, an E1 domain, an E2 domain and an E3 domain. The E1 domain is used to indicate whether there is any NACK_SN domain, ACK_SN_RANGE domain, E1 domain, E2 domain and E3 domain following the E1 domain. The E2 domain is used to indicate whether there is any NACK_SN_RANGE domain following the E2 domain. The E3 domain is used to indicate whether there is any SOstart domain and SOend domain following the E3 domain.

In a possible example, the status report further includes an ACK_SN domain, an SOstart domain and an SOend domain.

The processing unit 602 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 603 may be a transceiver, a transceiver circuit and the like. The storage unit 601 may be a memory.

When the processing unit 602 is a processor, the communication unit 603 is a communication interface and the storage unit 601 is a memory, the receiving-side RLC entity involved in the embodiment of the disclosure may be the receiving-side RLC entity illustrated in FIG. 4.

Figure 7:
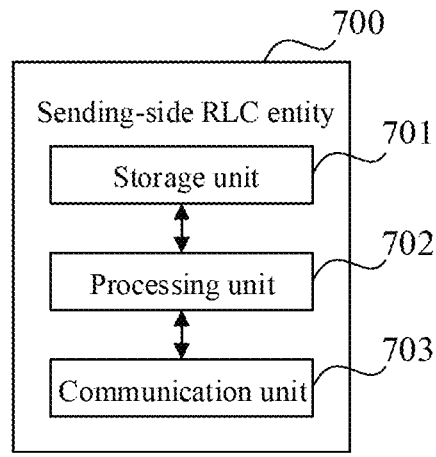
FIG. 7 is a block diagram of functional units of a sending-side RLC entity according to an embodiment of the disclosure.

Under the condition that an integrated unit is adopted, FIG. 7 is a possible block diagram of functional units of a sending-side RLC entity involved in the abovementioned embodiments. The sending-side RLC entity 700 includes a processing unit 702 and a communication unit 703. The processing unit 702 is configured to control and manage operations of the sending-side RLC entity. For example, the processing unit 702 is configured to support the sending-side RLC entity to execute steps 204 to 206 in FIG. 2 and/or is configured for another process of the technology described in the disclosure. The communication unit 703 is configured to support communication between the sending-side RLC entity and another device, for example, communication with the receiving-side RLC entity illustrated in FIG. 4. The sending-side RLC entity may further include a storage unit 701, configured to store a program code and data of the sending-side RLC entity.

The processing unit 702 is configured to send, through the communication unit 703, a first RLC PDU set to a receiving-side RLC entity. Here, the first RLC PDU set is generated according to a raw data segment. The processing unit 702 is further configured to receive, through the communication unit 703, a status report containing an indication domain for SNs of multiple RLC PDUs from the receiving-side RLC entity. Here, the status report is sent by the receiving-side RLC entity responsive to detecting that the multiple RLC PDUs in the first RLC PDU set are not successfully received. The processing unit 702 is further configured to send, through the communication unit 703, a second RLC PDU set to the receiving-side RLC entity. The first RLC PDU set and the second RLC PDU set are used to acquire the raw data segment.

In a possible example, the multiple RLC PDUs include N segments of continuous RLC PDUs, and the number of the RLC PDUs in each segment of continuous RLC PDUs is smaller than a preset number threshold, N is a positive integer; the indication domain for the SNs of the multiple RLC PDUs includes N NACK_SN_RANGE domains; and the status report further includes one CPT domain and N NACK_SN domains.

The CPT domain is used to indicate that the status report includes the NACK_SN_RANGE domains, the N NACK_SN_RANGE domains and the N NACK_SN domains form N combinational domains, the N combinational domains include no repeated domains, each combinational domain includes a NACK_SN domain and a NACK_SN_RANGE domain, each combinational domain is used to indicate the SNs of the RLC PDUs in the corresponding segment of continuous RLC PDUs, the NACK_SN domain in each combinational domain is used to indicate the maximum or minimum SN in the corresponding segment of continuous RLC PDUs and the NACK_SN_RANGE domain in each combinational domain is used to indicate the number of the RLC PDUs in the corresponding segment of continuous RLC PDUs.

In a possible example, the multiple RLC PDUs are N segments of continuous RLC PDUs, and the number of the RLC PDUs in each segment of continuous RLC PDUs is greater than the preset number threshold, N is a positive integer; the indication domain for the SNs of the multiple RLC PDUs includes N NACK_SN_END domains; and the status report further includes one CPT domain and N NACK_SN domains.

The CPT domain is used to indicate that the status report includes the NACK_SN_END domains. The N NACK_SN_END domains and the N NACK_SN domains form N combinational domains. The N combinational domains include no repeated domains. Each combinational domain includes a NACK_SN domain and a NACK_SN_END domain. Each combinational domain is used to indicate the SNs of the RLC PDUs in the corresponding segment of continuous RLC PDUs. The NACK_SN domain in each combinational domain is used to indicate the maximum SN in the corresponding segment of continuous RLC PDUs, and the NACK_SN_END domain in the combinational domain is used to indicate the minimum SN in the corresponding segment of continuous RLC PDUs. Or, the NACK_SN domain in each combinational domain is used to indicate the minimum SN in the corresponding segment of continuous RLC PDUs, and the ANCK_SN_END domain in the combinational domain is used to indicate the maximum SN in the corresponding segment of continuous RLC PDUs.

In a possible example, the multiple RLC PDUs include at least one discontinuous RLC PDU; the indication domain for the SNs of the multiple RLC PDUs is a bitmap domain; and the status report further includes one CPT domain and one NACK_SN domain.

The CPT domain is used to indicate that the status report includes the bitmap domain. The NACK_SN domain is used to indicate the maximum or minimum SN in the multiple RLC PDUs. The bitmap domain includes M bits, the M bits correspond to M continuous RLC PDUs. The M RLC PDUs and the RLC PDU indicated by the NACK_SN domain at least include the multiple RLC PDUs, each bit is used to indicate whether the corresponding RLC PDU is successfully received, and the RLC PDU indicated by the NACK_SN domain is adjacent to the M RLC PDUs, M being a positive integer.

In a possible example, the status report further includes a D/C domain, an E1 domain, an E2 domain and an E3 domain, the E1 domain is used to indicate whether there is any NACK_SN domain, ACK_SN_RANGE domain, E1 domain, E2 domain and E3 domain following the E1 domain, the E2 domain is used to indicate whether there is any NACK_SN_RANGE domain following the E2 domain, and the E3 domain is used to indicate whether there is any SOstart domain and SOend domain following the E3 domain.

In a possible example, the status report further includes an ACK_SN domain, an SOstart domain and an SOend domain.

The processing unit 702 may be a processor or a controller, which may be, for example, a CPU, a universal processor, a DSP, an ASIC, an FPGA or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 703 may be a transceiver, a transceiver circuit, an RF chip and the like. The storage unit 701 may be a memory.

When the processing unit 702 is a processor, the communication unit 703 is an RF chip and the storage unit 701 is a memory, the sending-side RLC entity involved in the embodiment of the disclosure may be the sending-side RLC entity illustrated in FIG. 5.

Figure 8:
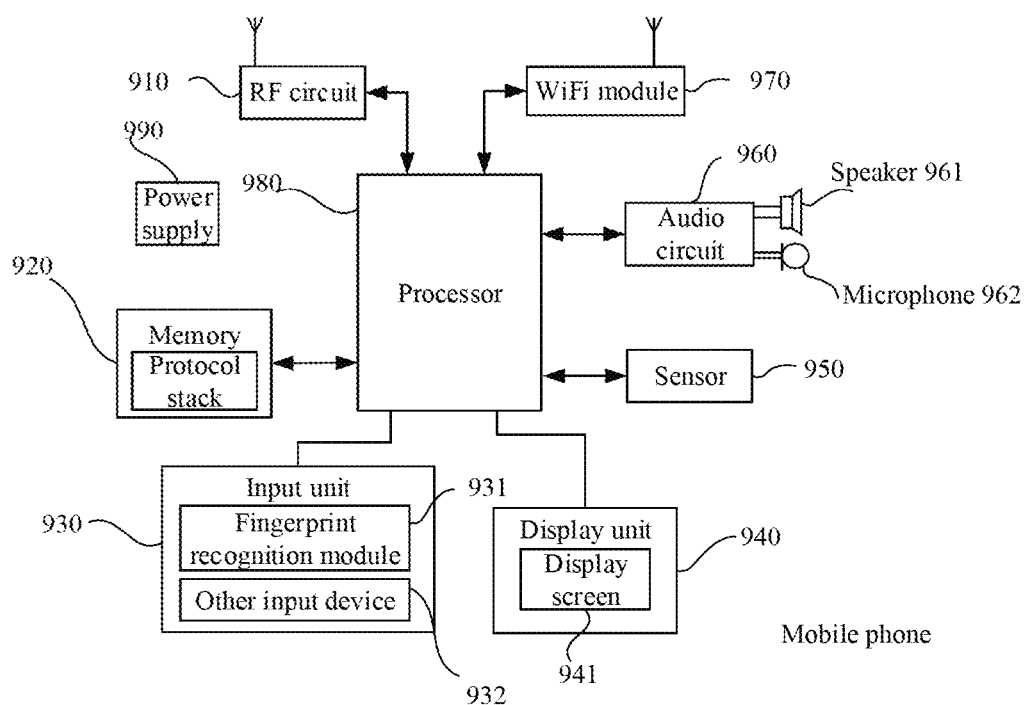
FIG. 8 is a structure diagram of a terminal according to an embodiment of the disclosure.

An embodiment of the disclosure also provides another terminal. As illustrated in FIG. 8, for convenient description, only parts related to the embodiment of the application are illustrated, and specific technical details which are undisclosed may be seen from parts of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 8 is a block diagram of part of a structure of a mobile phone related to a terminal according to an embodiment of the disclosure. As illustrated in FIG. 8, the mobile phone includes components such as an RF circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone illustrated in FIG. 8 is not intended to limit the mobile phone, and may include components more or fewer than those illustrated in the figure or some components are combined or different component arrangements are adopted.

Each component of the mobile phone will be specifically introduced below in combination with FIG. 8.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through wireless communication. Any communication standard or protocol may be adopted for wireless communication, including, but not limited to, a GSM, a GPRS, CDMA, WCDMA, LTE, an electronic mail, Short Messaging Service (SMS) and the like.

The memory 920 may be configured to store a software program and a module, for example, a protocol stack. The processor 980 operates the software program and module, for example, the protocol stack, stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 8, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and another sensor. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

An audio circuit 960, a speaker 961, and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, for example, another mobile phone through the RF circuit 910, or the audio data is played to the memory 920 for further processing.

WiFi is a short-distance wireless transmission technology. The mobile phone may help the user through the WiFi module 970 to receive and send an electronic mail, browse a webpage, access streaming media and the like, and wireless wideband Internet access is provided for the user. Although the WiFi module 970 is illustrated in FIG. 8, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 supplying power to each part. Preferably, the power supply may be logically connected with the processor 980 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the embodiment illustrated in FIG. 2, the flow on a receiving-side RLC entity side in each step of the method may be implemented based on the structure of the mobile phone.

In the embodiments illustrated in FIG. 4 and FIG. 5, each functional unit may be implemented based on the structure of the mobile phone.

An embodiment of the disclosure also provides a computer-readable storage medium, which stores a computer program for electronic data exchange, the computer program enabling a computer to execute part or all of the steps executed by the receiving-side RLC entity or the sending-side RLC entity in, for example, the abovementioned method embodiments.

An embodiment of the disclosure also provides a computer program product. The computer program product includes a non-transitory computer-readable storage medium storing a computer program. The computer program may be operated to enable a computer to execute part or all of the steps executed by the receiving-side RLC entity or the sending-side RLC entity in, for example, the abovementioned method embodiments. The computer program product may be a software installation package.

The steps of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made based on the technical solutions of the embodiments of the disclosure shall fall within the scope of protection of the embodiments of the disclosure.

The invention claimed is:

1. A method for radio link control (RLC) transmission, comprising:
   receiving a first RLC protocol data unit (PDU) set from a sending-side RLC entity, wherein the first RLC PDU set is generated by the sending-side RLC entity according to a raw data segment;
   responsive to detecting that multiple RLC PDUs in the first RLC PDU set are not successfully received, sending a status report containing an indication domain for sequence numbers (SNs) of the multiple RLC PDUs;

receiving a second RLC PDU set from the sending-side RLC entity; and acquiring the raw data segment according to the first RLC PDU set and the second RLC PDU set;

wherein the multiple RLC PDUs comprise at least one discontinuous RLC PDU; the indication domain for the SNs of the multiple RLC PDUs is a bitmap domain; the status report further comprises one control PDU type (CPT) domain and one Negative Acknowledgement_Sequence Number (NACK_SN) domain; and the CPT domain is used to indicate that the status report comprises the bitmap domains, the NACK_SN domain is used to indicate a maximum or minimum SN in the multiple RLC PDUs, the bitmap domains comprise M bits, the M bits correspond to M continuous RLC PDUs, the M RLC PDUs and the RLC PDU indicated by the NACK_SN domain at least comprise the multiple RLC PDUs, each bit is used to indicate whether a corresponding RLC PDU is successfully received, and the RLC PDU indicated by the NACK_SN domain is adjacent to the M RLC PDUs, M is a positive integer.

2. The method of claim 1, wherein the status report further comprises a data/control (D/C) domain, an extended 1 (E1) domain, an E2 domain and an E3 domain, the E1 domain is used to indicate whether there is any NACK_SN domain, Acknowledgement_Sequence Number_RANGE (ACK_SN_RANGE) domain, E1 domain, E2 domain and E3 domain following the E1 domain, the E2 domain is used to indicate whether there is any Negative Acknowledgement_Sequence Number_RANGE (NACK_SN_RANGE) domain following the E2 domain, and the E3 domain is used to indicate whether there is any Segmentation Offset start (SOstart) domain and Segmentation Offset end (SOend) domain following the E3 domain.

3. The method of claim 2, wherein the status report further comprises an Acknowledgement_Sequence Number (ACK_SN) domain, an SOstart domain, and an SOend domain.

4. A method for radio link control (RLC) transmission, comprising:

sending a first RLC protocol data unit (PDU) set to a receiving-side RLC entity, wherein the first RLC PDU set is generated according to a raw data segment;

receiving a status report containing an indication domain for sequence numbers (SNs) of multiple RLC PDUs from the receiving-side RLC entity, wherein the status report is sent by the receiving-side RLC entity responsive to detecting that the multiple RLC PDUs in the first RLC PDU set are not successfully received; and sending a second RLC PDU set to the receiving-side RLC entity, wherein the first RLC PDU set and the second RLC PDU set are used to acquire the raw data segment;

wherein the multiple RLC PDUs comprise at least one discontinuous RLC PDU; the indication domain for the SNs of the multiple RLC PDUs is a bitmap domain; the status report further comprises one control PDU type (CPT) domain and one Negative Acknowledgement_Sequence Number (NACK_SN) domain; and the CPT domain is used to indicate that the status report comprises the bitmap domains, the NACK_SN domain is used to indicate a maximum or minimum SN in the multiple RLC PDUs, the bitmap domains comprise M bits, the M bits correspond to M continuous RLC PDUs, the M RLC PDUs and the RLC PDU indicated by the NACK_SN domain at least comprise the multiple RLC PDUs, each bit is used to indicate whether a corresponding RLC PDU is successfully received, and the RLC PDU indicated by the NACK_SN domain is adjacent to the M RLC PDUs, M is a positive integer.

5. The method of claim 4, wherein the status report further comprises a data/control (D/C) domain, an extended 1 (E1) domain, an E2 domain and an E3 domain, the E1 domain is used to indicate whether there is any NACK_SN domain, Acknowledgement_Sequence Number_RANGE (ACK_SN_RANGE) domain, E1 domain, E2 domain and E3 domain following the E1 domain, the E2 domain is used to indicate whether there is any Negative Acknowledgement_Sequence Number_RANGE (NACK_SN_RANGE) domain following the E2 domain, and the E3 domain is used to indicate whether there is any Segmentation Offset start (SOstart) domain and Segmentation Offset end (SOend) domain following the E3 domain.

6. A user equipment (UE), comprising a processor and a communication interface, wherein the processor is configured to:

receive, through the communication interface, a first RLC protocol data unit (PDU) set from a sending-side RLC entity in a base station, wherein the first RLC PDU set is generated by the sending-side RLC entity according to a raw data segment, responsive to detecting that multiple RLC PDUs in the first RLC PDU set are not successfully received, send, through the communication interface, a status report containing an indication domain for sequence numbers (SNs) of the multiple RLC PDUs, receive, through the communication interface, a second RLC PDU set from the sending-side RLC entity, and acquire the raw data segment according to the first RLC PDU set and the second RLC PDU set;

wherein the multiple RLC PDUs comprise at least one discontinuous RLC PDU; the indication domain for the SNs of the multiple RLC PDUs is a bitmap domain; the status report further comprises one control PDU type (CPT) domain and one Negative Acknowledgement_Sequence Number (NACK_SN) domain; and the CPT domain is used to indicate that the status report comprises the bitmap domains, the NACK_SN domain is used to indicate a maximum or minimum SN in the multiple RLC PDUs, the bitmap domains comprise M bits, the M bits correspond to M continuous RLC PDUs, the M RLC PDUs and the RLC PDU indicated by the NACK_SN domain at least comprise the multiple RLC PDUs, each bit is used to indicate whether a corresponding RLC PDU is successfully received, and the RLC PDU indicated by the NACK_SN domain is adjacent to the M RLC PDUs, M is a positive integer.

7. The UE of claim 6, wherein the status report further comprises a data/control (D/C) domain, an extended 1 (E1) domain, an E2 domain and an E3 domain, the E1 domain is used to indicate whether there is any NACK_SN domain, Acknowledgement_Sequence Number_RANGE (ACK_SN_RANGE) domain, E1 domain, E2 domain and E3 domain following the E1 domain, the E2 domain is used to indicate whether there is any Negative Acknowledgement_Sequence Number_RANGE (NACK_SN_RANGE) domain following the E2 domain, and the E3 domain is used to indicate whether there is any Segmentation Offset start (SOstart) domain and Segmentation Offset end SOend) domain following the E3 domain.

8. The UE of claim 7, wherein the status report further comprises an Acknowledgement_Sequence Number (ACK_SN) domain, an SOstart domain, and an SOend domain.

9. A base station, comprising a processor and a radio frequency (RF) chip, wherein
the processor is configured to:
send, through the RF chip, a first RLC protocol data unit (PDU) set to a receiving-side RLC entity in a user equipment (UE), wherein the first RLC PDU set is generated according to a raw data segment,
receive, through the RF chip, a status report containing an indication domain for sequence numbers (SNs) of multiple RLC PDUs from the receiving-side RLC entity, wherein the status report is sent by the receiving-side RLC entity responsive to detecting that the multiple RLC PDUs in the first RLC PDU set are not successfully received, and
send, through the RF chip, a second RLC PDU set to the receiving-side RLC entity, wherein the first RLC PDU set and the second RLC PDU set are used to acquire the raw data segment;
wherein the multiple RLC PDUs comprise at least one discontinuous RLC PDU; the indication domain for the SNs of the multiple RLC PDUs is a bitmap domain; the status report further comprises one control PDU type (CPT) domain and one Negative Acknowledgement_Sequence Number (NACK_SN) domain; and the CPT domain is used to indicate that the status report comprises the bitmap domains, the NACK_SN domain is used to indicate a maximum or minimum SN in the multiple RLC PDUs, the bitmap domains comprise M bits, the M bits correspond to M continuous RLC PDUs, the M RLC PDUs and the RLC PDU indicated by the NACK_SN domain at least comprise the multiple RLC PDUs, each bit is used to indicate whether a corresponding RLC PDU is successfully received, and the RLC PDU indicated by the NACK_SN domain is adjacent to the M RLC PDUs, M is a positive integer.

10. The base station of claim 9, wherein the status report further comprises a data/control (D/C) domain, an extended 1 (E1) domain, an E2 domain and an E3 domain, the E1 domain is used to indicate whether there is any NACK_SN domain, Acknowledgement_Sequence Number_RANGE (ACK_SN_RANGE) domain, E1 domain, E2 domain and E3 domain following the E1 domain, the E2 domain is used to indicate whether there is any Negative Acknowledgement_Sequence Number_RANGE (NACK_SN_RANGE) domain following the E2 domain, and the E3 domain is used to indicate whether there is any Segmentation Offset start (SOstart) domain and Segmentation Offset end (SOend) domain following the E3 domain.

11. The base station of claim 10, wherein the status report further comprises an Acknowledgement_Sequence Number (ACK_SN) domain, an SOstart domain and an SOend domain.

* * * * *